United States Patent
Kato (10) Patent No.: US 9,025,214 B2
(45) Date of Patent: May 5, 2015

(54) IMAGE READING APPARATUS, IMAGE READING METHOD, AND COMPUTER-READABLE MEDIUM

(71) Applicant: Fuji Xerox Co., Ltd., Minato-ku, Tokyo (JP)

(72) Inventor: Nobutaka Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/219,634

(22) Filed: Mar. 19, 2014

(65) Prior Publication Data

US 2015/0043042 A1 Feb. 12, 2015

(30) Foreign Application Priority Data

Aug. 9, 2013 (JP) ................. 2013-166097

(51) Int. Cl.
*H04N 1/04* (2006.01)
*H04N 1/12* (2006.01)

(52) U.S. Cl.
CPC ....................... *H04N 1/12* (2013.01)

(58) Field of Classification Search
CPC . H04N 1/0035; H04N 1/40093; H04N 1/409; H04N 1/56; H04N 1/00204; H04N 1/00326; H04N 1/00331; H04N 1/32363; H04N 1/3871; H04N 1/4115; H04N 1/42; H04N 2201/0093
USPC ......... 358/1.15, 401, 403, 434, 444, 448, 468
See application file for complete search history.

(56) References Cited

U.S. PATENT DOCUMENTS

| | | | | |
|---|---|---|---|---|
| 5,257,074 A * | 10/1993 | Kamei | ........................ | 382/187 |
| 5,671,067 A * | 9/1997 | Negishi et al. | ............... | 358/403 |
| 6,167,328 A * | 12/2000 | Takaoka et al. | .............. | 700/264 |
| 7,472,348 B2 * | 12/2008 | Tanioka | ........................ | 715/269 |
| 8,468,213 B2 * | 6/2013 | Kamata et al. | ............... | 709/217 |
| 8,634,841 B2 * | 1/2014 | Lee et al. | ..................... | 455/450 |
| 8,797,571 B2 * | 8/2014 | Kong | ......................... | 358/1.15 |
| 2006/0217958 A1 * | 9/2006 | Tagawa et al. | .................... | 704/2 |
| 2009/0019132 A1 * | 1/2009 | Kamata et al. | ............... | 709/217 |
| 2012/0263380 A1 * | 10/2012 | Terao | .......................... | 382/182 |

FOREIGN PATENT DOCUMENTS

JP 2013-008122 A 1/2013

* cited by examiner

*Primary Examiner* — Negussie Worku
(74) *Attorney, Agent, or Firm* — Sughrue Mion, PLLC

(57) ABSTRACT

An image reading apparatus includes a reading unit, a character recognition unit, and a display unit for a display according to a language which is set. The reading unit reads out a document and generates image data. The character recognition unit recognizes a character included in the image data in order to orient the image data upright. The display unit displays information specifying an orientation of the character in the document with respect to the reading unit, when the language which is set is a language which is not recognizable by the character recognition unit.

12 Claims, 6 Drawing Sheets

FIG. 6

| DOCUMENT READOUT SETTING | | SETTING OF TOP DIRECTION OF CHARACTERS | |
|---|---|---|---|
| READOUT SPECIFICATION | | TOP | LEFT |
| SINGLE SIDE | | | |
| DOUBLE SIDE (FLIP ON SHORT EDGE) | | | |
| DOUBLE SIDE (FLIP ON LONG EDGE) | | | |

IMAGE READING APPARATUS, IMAGE READING METHOD, AND COMPUTER-READABLE MEDIUM

CROSS-REFERENCE TO RELATED APPLICATIONS

This application is based on and claims priority under 35 USC 119 from Japanese Patent Application No. 2013-166097 filed Aug. 9, 2013.

BACKGROUND

Technical Field

The present invention relates to an image reading apparatus, an image reading method, and a computer-readable medium.

SUMMARY

According to an aspect of the present invention, there is provided an image reading apparatus including a reading unit, a character recognition unit, and a display unit for a display according to a language which is set. The reading unit reads out a document and generates image data. The character recognition unit recognizes a character included in the image data in order to orient the image data upright. The display unit displays information specifying an orientation of the character in the document with respect to the reading unit, when the language which is set is a language which is not recognizable by the character recognition unit.

BRIEF DESCRIPTION OF THE DRAWINGS

Exemplary embodiment of the present invention will be described in detail based on the following figures, wherein.

DETAILED DESCRIPTION

An exemplary embodiment of an image reading apparatus in the present invention will be described below. However, the present invention is not limited to the exemplary embodiment described below.

Figure 1:
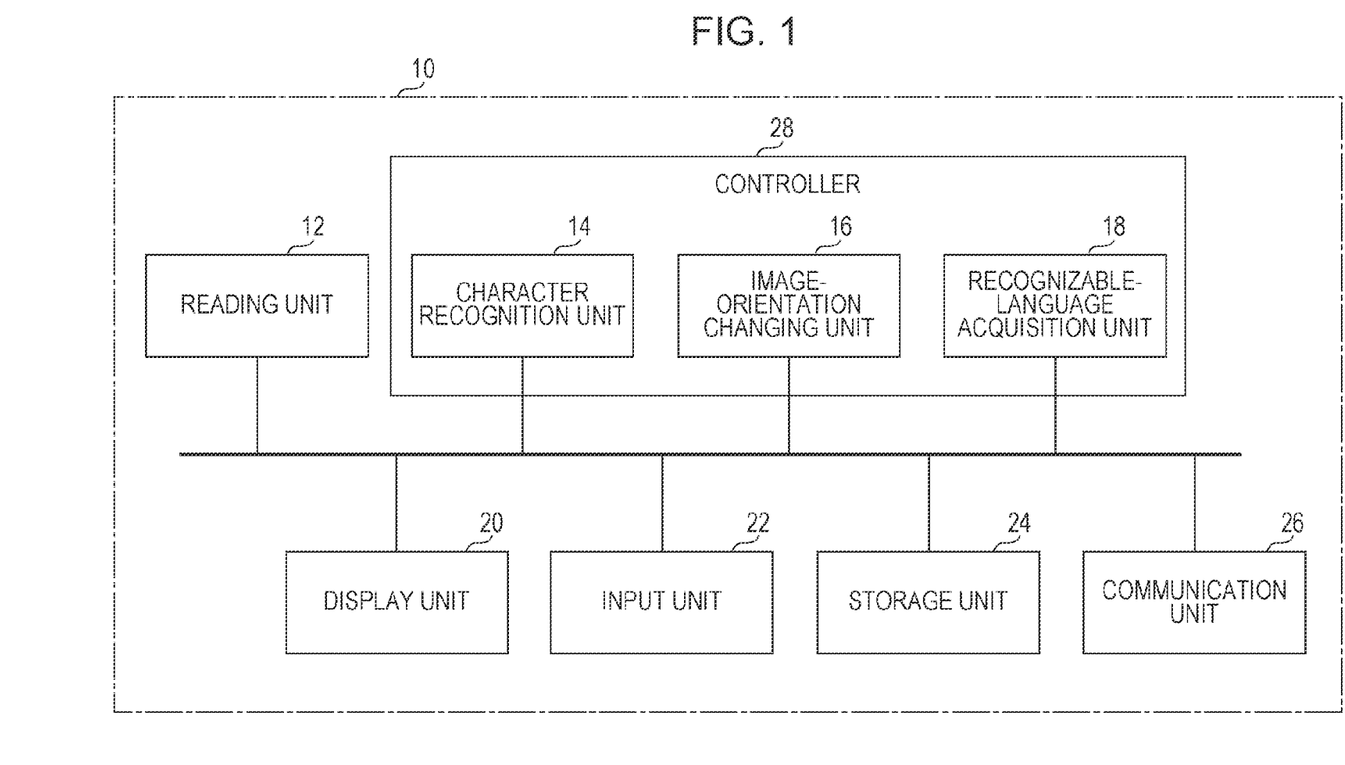
FIG. 1 is a schematic diagram illustrating the configuration of an image reading apparatus according to an exemplary embodiment.

FIG. 1 is a schematic diagram illustrating the configuration of an image reading apparatus 10 according to the exemplary embodiment. The image reading apparatus 10 includes a reading unit 12, a character recognition unit 14, an image-orientation changing unit 16, a recognizable-language acquisition unit 18, a display unit 20, an input unit 22, a storage unit 24, a communication unit 26, and a controller 28. The controller 28 includes the character recognition unit 14, the image-orientation changing unit 16, and the recognizable-language acquisition unit 18. These units are connected to each other via a bus. The image reading apparatus 10 may be a multi-function device including a computer having a print function, a copy function, a scanner function, a communication function, and the like, or may be an apparatus having only a scanner function.

The reading unit 12 is a scanner for reading out a document optically to obtain image data. The reading unit 12 may include a tray on which a document is mounted, a transport mechanism for transporting the document from the tray to a reading section, and the like. The reading unit 12 may be such that, after a user mounts a document directly on a plastic or glass document stand, the document mounted on the document stand is read out.

The character recognition unit 14 recognizes characters or Arabic numerals included in the image data which is read out by the reading unit 12. The character recognition unit 14 may use a known optical character recognition (OCR) technique. In the exemplary embodiment, the character recognition unit 14 supports Japanese, English, German, French, and Chinese, and may support other languages. The character recognition unit 14 recognizes characters of the supported languages from image data, but does not support all languages. The character recognition unit 14 does not recognize characters of non-supported languages from image data. In the exemplary embodiment, the character recognition unit 14 does not support Thai.

The image-orientation changing unit 16 changes the orientation of image data which is read out by the reading unit 12, on the basis of the characters or the Arabic numerals recognized by the character recognition unit 14. Specifically, the image-orientation changing unit 16 recognizes the top and the bottom of the characters or the Arabic numerals which are recognized, and rotates the image data so that the top direction of the characters or the Arabic numerals included in the image data matches that of the image data. Alternatively, without rotating the image data, the image-orientation changing unit 16 may simply add information about the top direction of characters to the image data.

The recognizable-language acquisition unit 18 obtains the types of language recognized by the character recognition unit 14. In the exemplary embodiment, the storage unit 24 described below stores in advance a list of languages recognized by the character recognition unit 14. The recognizable-language acquisition unit 18 obtains the list, and thereby obtains the types of language recognized by the character recognition unit 14. Alternatively, when the list of languages recognized by the character recognition unit 14 is stored in an external server or the like, the types of language recognized by the character recognition unit 14 may be obtained from the external server or the like via the communication unit 26 described below.

The display unit 20, which is, for example, a monitor provided on the front panel of the image reading apparatus 10, displays information or the like for supporting various settings of the image reading apparatus 10 or supporting a user. A user may select a language used for the display on the display unit 20, and characters are displayed on the display unit 20 by using the language which is set. In the exemplary embodiment, the selectable languages are Japanese, English, German, French, Chinese, and Thai, but are not limited to these. Other languages may be selected. The display unit 20 may perform a display operation by using a language which is not supported by the character recognition unit 14. In the exemplary embodiment, the character recognition unit 14 does not support Thai, but the display unit 20 may perform a display operation by using Thai.

The input unit 22, which is constituted by, for example, buttons and switches provided on the front panel of the image reading apparatus 10, receives an instruction given by a user to the image reading apparatus 10. In the exemplary embodiment, the display unit 20 includes a touch panel, and the buttons are displayed on the display unit 20 so as to serve as a part of the input unit 22. Therefore, in the exemplary embodiment, some functions of the input unit 22 are included in the display unit 20.

The storage unit 24, which is, for example a read-only memory (ROM) or a random-access memory (RAM), stores various types of information, such as programs for operating the image reading apparatus 10, and setting information of the units.

The communication unit 26, which is, for example, a network card, is a unit for communicating with other devices via a local-area network (LAN) or the Internet.

The controller 28, which is a central processing unit (CPU) of the image reading apparatus 10, not only performs the above-described functions of the character recognition unit 14, the image-orientation changing unit 16, and the recognizable-language acquisition unit 18, but also performs a control operation, such as an operation to operate the reading unit 12 in accordance with an input from the input unit 22, an operation to change the display on the display unit 20, or the like.

Figure 2:
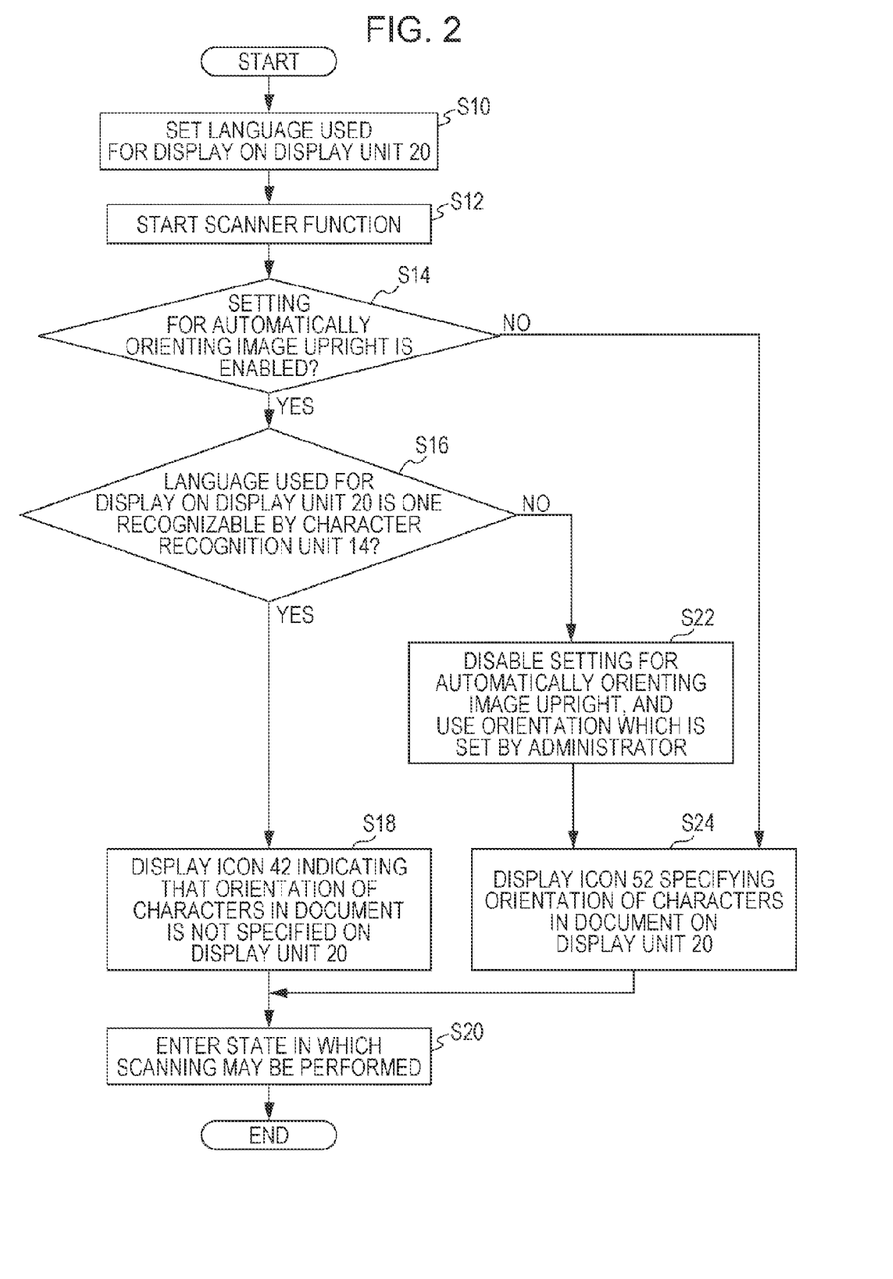
FIG. 2 is a flowchart of a process performed by the image reading apparatus according to the exemplary embodiment.

Operations performed by the image reading apparatus 10 according to the exemplary embodiment will be described below. FIG. 2 is a flowchart of a process performed by the image reading apparatus 10 according to the exemplary embodiment.

In step S10, the controller 28 sets the language used for the display on the display unit 20, on the basis of an instruction from a user.

Figure 3:
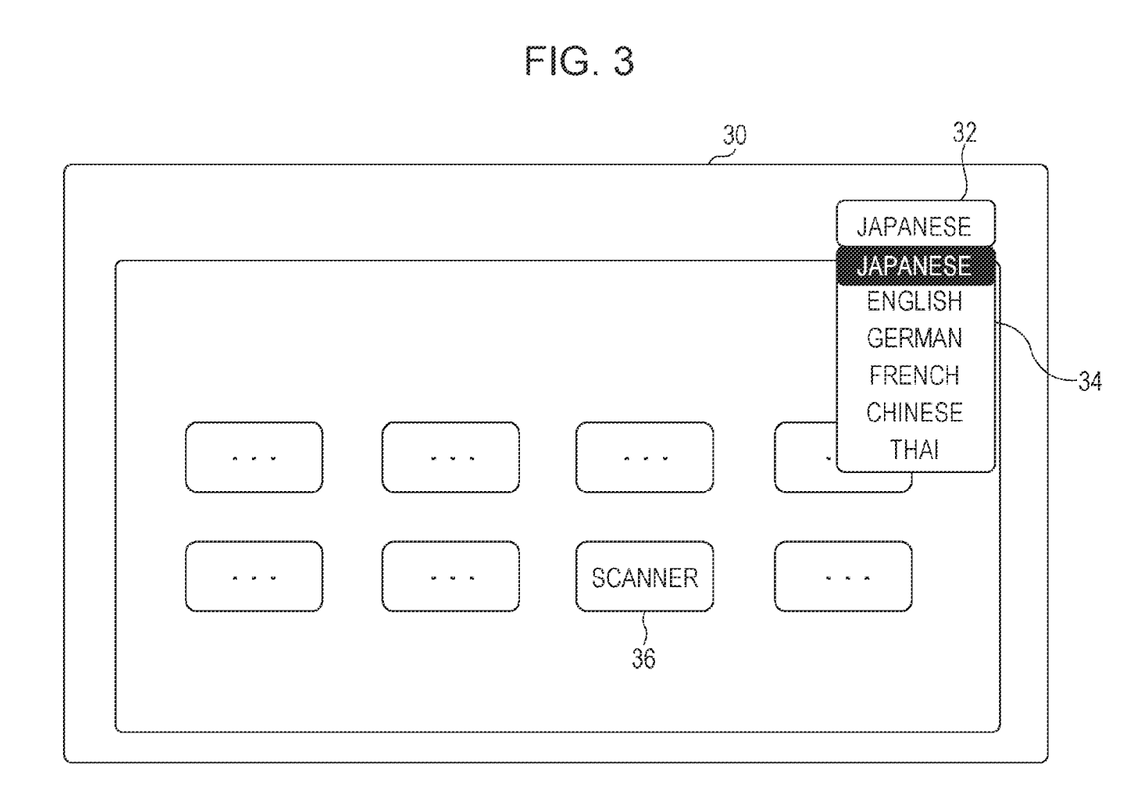
FIG. 3 is a diagram illustrating a language selection button and a scanner-function selection button which are displayed on a display unit.

FIG. 3 is a diagram illustrating a language selection button 32 and a scanner-function selection button 36 displayed on the display unit 20. For example, when the image reading apparatus 10 starts, the controller 28 displays a screen 30 illustrated in FIG. 3, on the display unit 20.

The language selection button 32 is provided on the screen 30. In the exemplary embodiment, when a user touches the language selection button 32, the controller 28 displays a selectable language list 34 which is a list of the languages which may be displayed by the display unit 20. When the user selects a specific language in the selectable language list 34, the controller 28 sets the selected language as the language used for the display on the display unit 20. After that, the controller 28 displays characters by using the language which is set.

In step S12, the controller 28 starts the scanner function. In the exemplary embodiment, the image reading apparatus 10 is a multi-function device, and has functions other than the scanner function. Therefore, the image reading apparatus 10 starts the scanner function on the basis of an instruction from a user. Specifically, when the user touches the scanner-function selection button 36 provided on the screen 30, the controller 28 starts the scanner function.

In step S14, the controller 28 determines whether or not a setting for automatically orienting an image upright is enabled in the image reading apparatus 10. If the setting for automatically orienting an image upright is enabled, the process proceeds to step S16. If the setting for automatically orienting an image upright is disabled, the process proceeds to step S24.

If the setting for automatically orienting an image upright is enabled, a series of the following operations are performed: an operation in which the character recognition unit 14 recognizes characters or Arabic numerals from the image data which has been read out by the reading unit 12; and an operation in which the image-orientation changing unit 16 rotates the image data so that the top direction of the recognized characters or Arabic numerals matches that of the image data. If the setting for automatically orienting an image upright is disabled, these operations are not performed, and it is assumed that the top direction of the image data matches a predetermined direction with respect to the reading unit 12 which is set in advance in the image reading apparatus 10.

In the exemplary embodiment, only an administrator of the image reading apparatus 10 may enable or disable the setting for automatically orienting an image upright. If the setting for automatically orienting an image upright is disabled, only the administrator of the image reading apparatus 10 may change the predetermined orientation which is set to the top direction of image data.

In step S16, the controller 28 determines whether or not the language which is used for the display on the display unit 20 and which is set in step S10 is a language in which the character recognition unit 14 may recognize characters. In the exemplary embodiment, the recognizable-language acquisition unit 18 obtains the list which is stored in the storage unit 24 in advance and which contains the types of language in which the character recognition unit 14 may recognize characters, and the controller 28 determines whether or not the language which is set as the language used for the display on the display unit 20 is included in the list. If the language used for the display on the display unit 20 is a language which is recognizable by the character recognition unit 14, the process proceeds to step S18. If the language used for the display on the display unit 20 is a language which is not recognizable by the character recognition unit 14, the process proceeds to step S22.

In step S18, the controller 28 displays a figure (icon) indicating that no predetermined directions are specified as the orientation of the characters contained in a document, on the display unit 20. In the exemplary embodiment, processes are performed under the assumption that a document which is read out by the reading unit 12 contains characters in the language that is used for the display on the display unit 20 and that is set in step S10. For example, if the language used for the display on the display unit 20 is set to Japanese, processes are performed under the assumption that a document which is read out by the reading unit 12 contains Japanese characters.

If the language used for the display on the display unit 20 is determined to be a language which is recognizable by the character recognition unit 14, it is assumed that the character recognition unit 14 may recognize characters included in the image data obtained by using the reading unit 12 reading out a document. Therefore, even when the orientation of the characters in a document with respect to the reading unit 12 is any orientation, it is assumed that the top direction of the image data is modified by using the function of automatically orienting an image upright to obtain a correct orientation (orientation in which characters may be read). Since a user may insert a document to the reading unit 12 regardless of the orientation of the characters in the document, the controller 28 displays an icon indicating that no predetermined directions are specified as the orientation of the characters in the document, on the display unit 20.

An icon indicating that no predetermined directions are specified as the orientation of the characters in a document means that the image data is automatically oriented upright. Therefore, the user knows that, by checking the icon indicating that no predetermined directions are specified as the orientation of the characters in a document, image data obtained by scanning a document is automatically oriented upright if the language displayed on the display unit 20 is used in the document.

Figure 4:
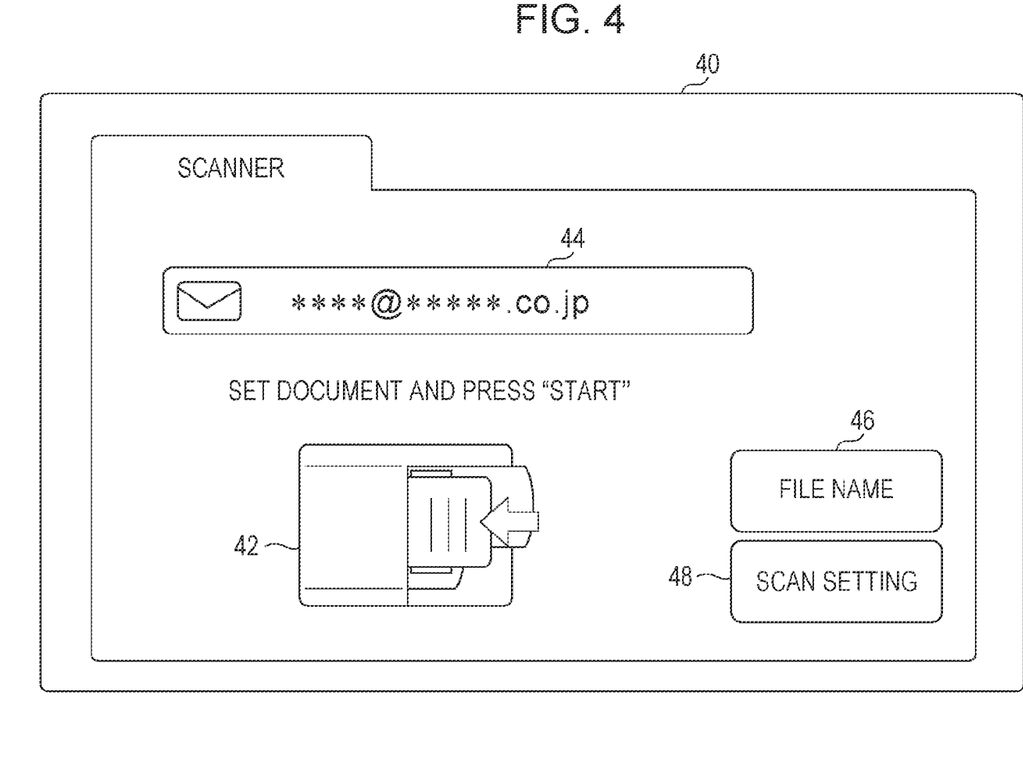
FIG. 4 is a diagram illustrating the display of the display unit at the time when the language used for display is English.

FIG. 4 is a diagram illustrating the display on the display unit 20 at the time when the language used for display is English. In the exemplary embodiment, since the character recognition unit 14 may recognize English characters, an icon 42 indicating that the orientation of the characters in a document is not specified is displayed on a screen 40.

As long as the user understands that the image data is automatically oriented upright, the display is not limited to the icon 42. For example, a string such as "Since image data is automatically oriented upright, any orientation of the characters in a document is acceptable" may be displayed.

On the screen 40, an address input field 44 for inputting the transmission destination of image data, a file name button 46 for displaying a screen for specifying the file name of the image data, and a scan setting button 48 for displaying a screen for setting the image quality of the scanner or the like are also displayed.

In step S20, the controller 28 is in the state in which scanning may be performed, and is waiting a user instruction to execute scanning.

In step S16, if the language used for the display on the display unit 20 is a language which is not recognizable by the character recognition unit 14, that is, if it is determined that the document which has been read out by the reading unit 12 does not contain characters in a language which is recognizable by the character recognition unit 14, the process proceeds to step S22.

In step S22, the character recognition unit 14 disables the setting for automatically orienting an image upright. When the setting for automatically orienting an image upright is disabled, the top direction of the image data which has been read out by the reading unit 12 is not modified, so that the orientation which was read out by the reading unit 12 is maintained. An administrator determines which direction is to be the top direction with respect to the reading orientation of the reading unit 12, as described above.

In step S24, the controller 28 displays an icon specifying the orientation of the characters in a document that is to be scanned, on the display unit 20. If it is determined that the language for characters contained in the document is a language which is not recognized by the character recognition unit 14, the character recognition unit 14 is not capable of recognizing the characters. Accordingly, it is not possible for the function of automatically orienting an image upright to be performed correctly. Therefore, in this case, the controller 28 disables the function of automatically orienting an image upright in step S22, and displays an icon specifying the orientation of the characters in a document on the display unit 20 in step S24 so that the image data is oriented to the appropriate direction (direction in which the characters may be read) with respect to a user.

The setting for automatically orienting an image upright is disabled in step S22. This is because the function of automatically orienting an image upright is prevented from being actually activated regardless of the display of an icon specifying the orientation of the characters in a document on the display unit 20 (that is, regardless of the display of an icon indicating that the function of automatically orienting an image upright will not be activated). For example, when a display operation is performed on the display unit 20 by using Thai, a document containing English characters may be scanned. In this case, if the setting for automatically orienting an image upright is continued to be enabled, regardless of a state in which an icon indicating that the function of automatically orienting an image upright will not be activated is displayed on the display unit 20 since Thai is selected as the language used for display, the character recognition unit 14 is capable of recognizing English, and the function of automatically orienting an image upright is therefore activated actually. Thus, the setting for automatically orienting an image upright is set to be disabled in step S22 so that the image reading apparatus 10 is prevented from performing an operation different from one expected by a user.

Figure 5:
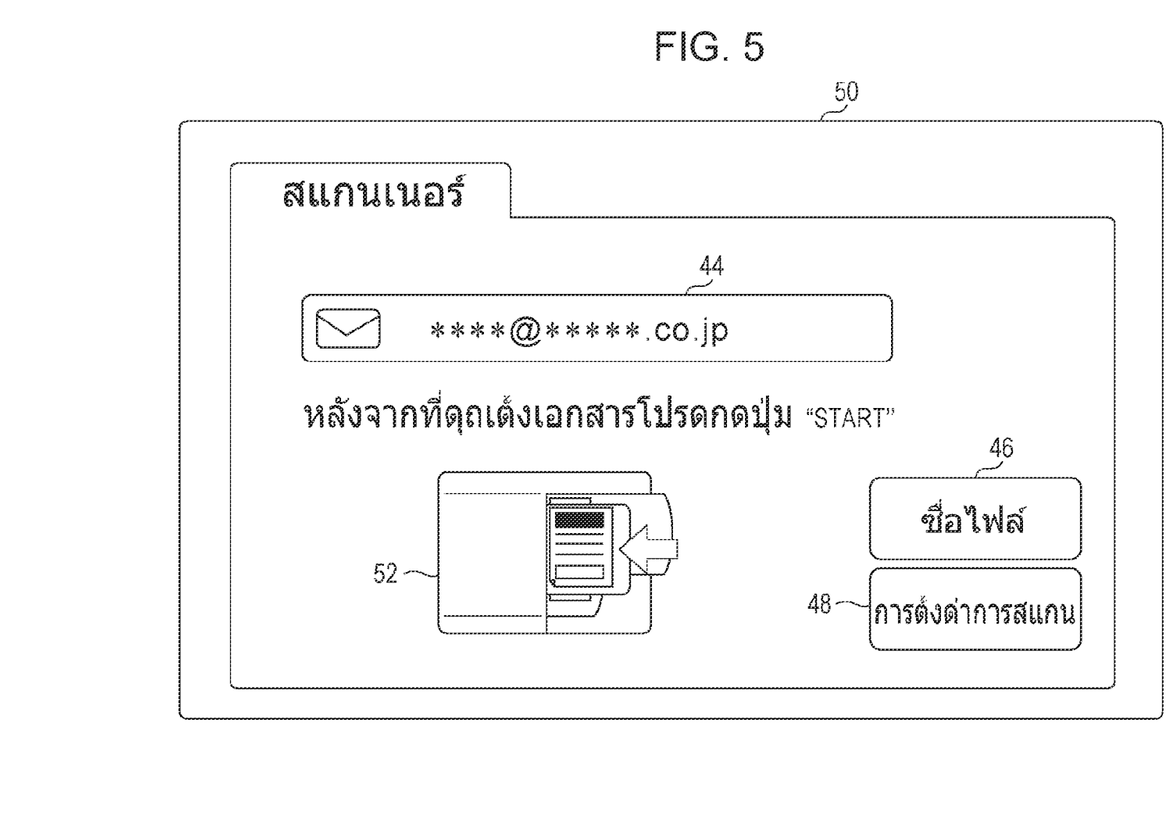
FIG. 5 is a diagram illustrating the display of the display unit at the time when the language used for display is Thai.

FIG. 5 is a diagram illustrating the display on the display unit 20 at the time when the language used for display is Thai. In the exemplary embodiment, the character recognition unit 14 does not recognize Thai characters. Therefore, an icon 52 specifying the orientation of the characters in a document is displayed on a screen 50.

Similarly to the case of FIG. 4, as long as the orientation of the characters in a document is specified, the display is not limited to the icon 52. For example, a string such as "Set the top direction of the characters in a document to the left direction with respect to the tray" may be displayed.

Figure 6:
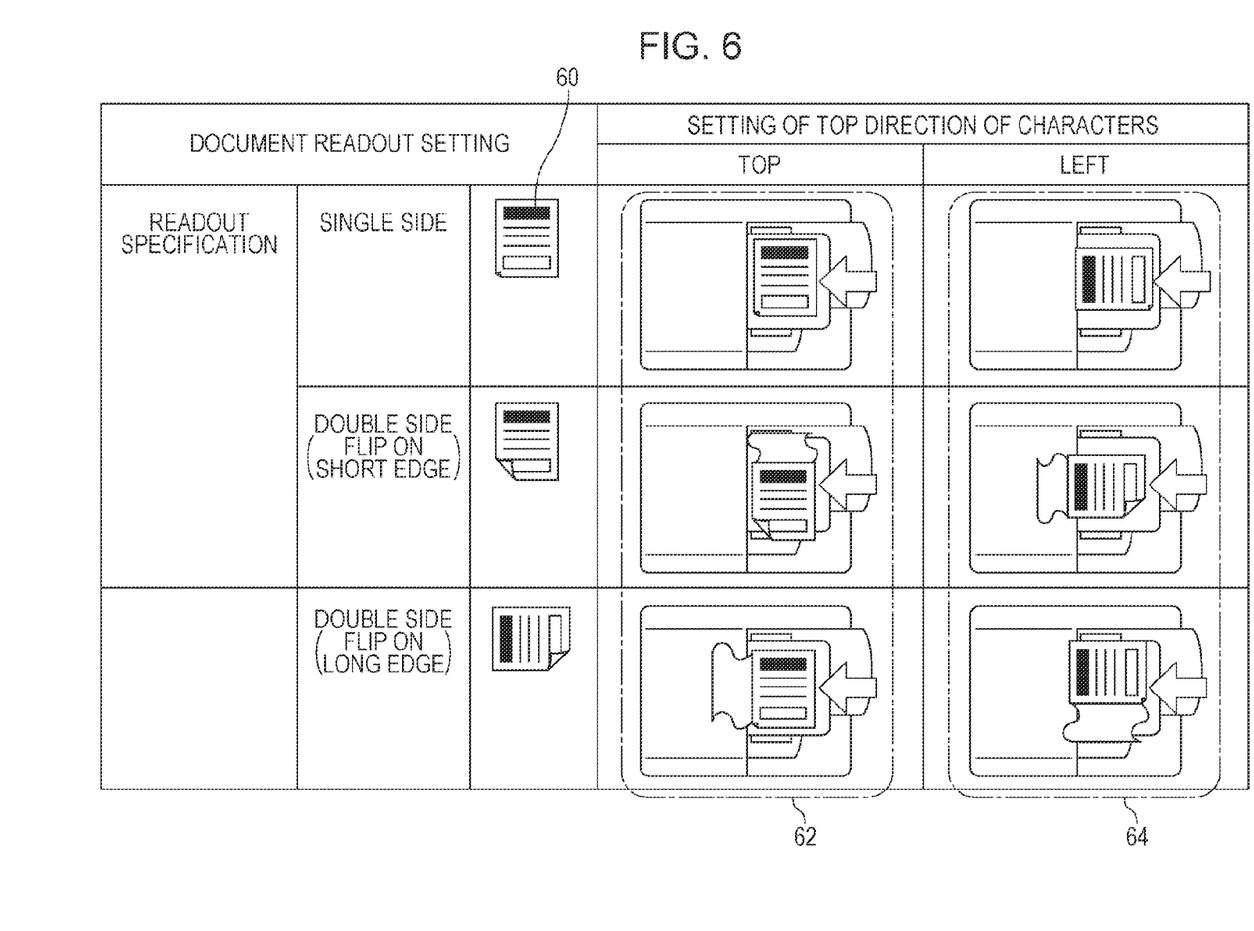
FIG. 6 is a diagram illustrating exemplary icons specifying the orientation of characters in a document.

FIG. 6 is a diagram illustrating exemplary icons specifying the orientation of characters in a document. The controller 28 changes an icon to be displayed, in accordance with the setting of the top direction with respect to the reading unit 12 which is set by an administrator.

As illustrated in FIG. 6, when the top direction of characters is directed to the "top", icons 62 representing a document which is put on a tray so that the top direction of the characters in a document is directed to the top (in an orientation in which a user may read the characters in the document) are displayed. The side indicated by a top-direction indicating stamp 60 displayed in a specific color (red in the exemplary embodiment) indicates the top direction of the characters in a document. When the top direction of characters is set to the "left", icons 64 representing a document which is put on a tray so that the top direction of the characters in a document is directed to the left (in an orientation in which the top direction of the characters in a document is oriented in the left direction when viewed by a user) are displayed.

Both of an icon 62 and an icon 64 include representation of part of a document tray, and are icons indicating the assumption of a case in which a document is inserted in the document tray. Alternatively, a document tray may be pulled up, and a document which is put directly on the plastic or glass document stand may be scanned. In this case, the controller 28 may detect the state in which the document tray is pulled up, and may change the icon that is to be displayed, to an icon which specifies the orientation of the characters in a document and which represents a state in which a document is put on the document stand, on the basis of the detection result.

As described above, in the exemplary embodiment, processes are performed under the assumption that characters in the language which is used for the display on the display unit 20 and which is set are contained in a document.

Typically, the controller 28 needs to obtain the language type of the characters contained in a document in order to perform the following display operations: a display operation to display an indication that the function of automatically orienting an image upright may be used on the display unit 20 if characters recognized by the character recognition unit 14 are contained in a document; and a display operation to display the orientation of a document, for a user on the display unit 20 when characters recognized by the character recognition unit 14 are not contained in the document.

In order that the controller 28 determines whether or not the language of the characters contained in a document is a language which is recognizable by the character recognition unit 14, it is necessary to actually read out a document or for a user to input the language type used in the document from the input unit 22. However, either of the methods causes the user to be forced to perform some operation.

Therefore, in the exemplary embodiment, it is assumed that characters in the language which is used for the display on the display unit 20 and which is set are contained in a document. On the basis of this, without forcing the user to perform an additional operation, the following display operations are performed: a display operation to display an indication that the function of automatically orienting an image upright may be used on the display unit 20 when it is assumed that characters recognized by the character recognition unit 14 are contained in a document; and a display operation to display the orientation of a document, for a user on the display unit 20 when it is assumed that characters recognized by the character recognition unit 14 are not contained in a document.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a reading unit that reads out a document and generates image data;
    a display unit that displays information;
    a setting unit that sets a language used for the display on the display unit;
    a character recognition unit that recognizes a character in the image data; and
    an image-orientation changing unit that changes the image data upright based on the orientation of the recognized character, in response to the set language being recognizable by the character recognition unit, and that specifies information, which is displayed by the display unit and is about an orientation of the character in the document with respect to the reading unit, in response to the set language being unrecognizable by the character recognition unit.

2. The image reading apparatus according to claim 1, wherein in response to the set language being recognizable by the character recognition unit, the display unit displays information describing that the image data is to be oriented upright.

3. The image reading apparatus according to claim 2, wherein the information describing that the image data is to be oriented upright is an icon that describes that the image data is to be oriented upright and does not specify an orientation of a character in a document.

4. The image reading apparatus according to claim 1, wherein the information specifying the orientation of the character in the document with respect to the reading unit is an icon that specifies an orientation of a character in a document.

5. The image reading apparatus according to claim 1, wherein the set language is one language from among a plurality of different languages that are settable.

6. The image reading apparatus according to claim 5, wherein at least one language from among the plurality of languages is a language that is unrecognizable by the character recognition unit.

7. The image reading apparatus according to claim 6, wherein at least one language from among the plurality of languages is a language that is recognizable by the character recognition unit.

8. The image reading apparatus according to claim 7, wherein in response to the set language being recognizable by the character recognition unit, the image data is oriented upright regardless of an orientation of the document relative to the reading unit.

9. The image reading apparatus according to claim 1, wherein in response to the set language being recognizable by the character recognition unit, the image data is oriented upright regardless of an orientation of the document relative to the reading unit.

10. The image reading apparatus according to claim 1, wherein the information displayed by the display unit is an icon that specifies an orientation of a character in a document, and
    in response to the document being placed directly on the reading unit, the icon specifies a state in which the document is placed on the reading unit.

11. A non-transitory computer readable medium storing a program causing a computer to execute a process for reading an image, the process comprising:
    reading out a document and generating image data;
    recognizing a character included in the image data;
    setting a language; and
    in response to the set language being recognizable by a character recognition unit, causing the image data to be oriented upright based on an orientation of the recognized character; and
    in response to the set language being unrecognizable by the character recognition unit, specifying information, which is displayed by the display unit and is about an orientation of the character in the document.

12. An image reading method comprising:
    using a scanner to read out a document and generate image data;
    recognizing a character included in the image data;
    setting a language; and
    in response to the set language being recognizable by a character recognition unit, causing the image data be oriented upright based on an orientation of the recognized character; and
    in response the set language being unrecognizable by the character recognition unit, specifying information, which is displayed by the display unit and is about an orientation of the character in the document.

* * * * *